(No Model.)
T. MAXON.
WAGON JACK.
No. 292,441. Patented Jan. 22, 1884.
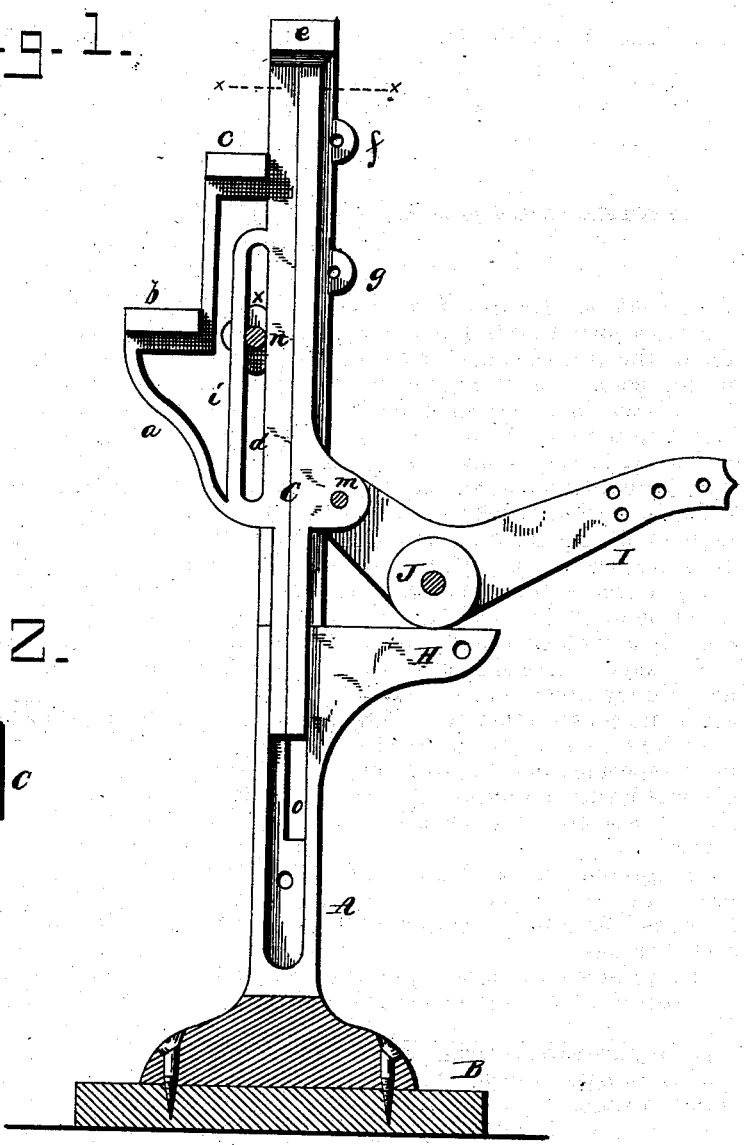
WITNESSES
Edwin L. Jewce.
J. J. M?Carthy.
INVENTOR
Thomas Maxon
By C. M. Alexander
Attorney

UNITED STATES PATENT OFFICE.

THOMAS MAXON, OF DAYTON, OHIO, ASSIGNOR OF ONE-HALF TO JAMES W. CARPENTER, OF SAME PLACE.

WAGON-JACK.

SPECIFICATION forming part of Letters Patent No. 292,441, dated January 22, 1884.

Application filed November 8, 1883. (No model.)

*To all whom it may concern:*

Be it known that I, THOMAS MAXON, a citizen of the United States, residing at Dayton, in the county of Montgomery and State of Ohio, have invented certain new and useful Improvements in Wagon-Jacks, of which the following is a specification, reference being had therein to the accompanying drawings.

My invention relates to lifting-jacks to be used in lifting the axles of light vehicles for such purposes as may be necessary.

My object is to make a comparatively light implement, which shall at the same time be durable and efficient and quickly operated.

To enable those skilled in the art to make and use my invention, I will proceed to describe its construction and operation.

In the accompanying drawings, making part of this specification, Figure 1 represents a side elevation, with one side of the frame removed. Fig. 2 is a cross-section taken through the line $x\ x$.

A represents in the drawings only one half of the frame of the jack. The pedestal of this frame is bolted to any suitable base, B representing a base.

H represents a bracket upon the frame, the purpose of which will be described hereinafter.

$f$ and $g$ are ears, through which bolts are intended to pass to secure the two parts of the frame together.

$x$ is another ear on the frame, which carries a pin that works in a loop, to be described, to act as a guide.

C represents a sliding bar, which plays up and down between the two parts of the frame in a suitable recess made to receive it. This bar is provided on one side with a bracket, the small bar $a$ being the lower and main support. $b$ and $c$ are steps upon the bracket to enable the jack to be accommodated to axles of different heights.

$i$ represents a portion of the bracket, which runs parallel to the bar C, leaving a vertical opening, $d$, between the two. The pin $n$ on ear $x$ of the frame plays in this opening and acts as a guide for the bar C.

I represents a lever, which is provided with a wheel, J, at an elbow in it, and which is pivoted to the bar C at $m$. The wheel J rests and plays upon the bracket H of the frame. The bar C is raised and lowered by this lever I, and when the bar is at its highest capacity the pivot of the wheel J rests under the pivot $m$, and thus the bar with its burden is sustained until it is desirable to change it. The top $e$ of the bar is the highest of the lifting points. The bottom of the bar C rests when down in the bottom of slot $o$ of the frame.

Having thus fully described my invention, what I claim as new, and desire to secure by Letters Patent, is—

The divided frame A, with its bracket H, in combination with the vertically-playing bar C, having its bracket with steps and guide-opening $d$, and the operating-lever I, with wheel J, the several parts being constructed and operating as and for the purpose set forth.

In testimony whereof I affix my signature in presence of two witnesses.

THOMAS MAXON.

Witnesses:
   EDWARD L. ROWE,
   WEBSTER W. SHUEY.